United States Patent
Rao

(10) Patent No.: US 11,420,428 B2
(45) Date of Patent: Aug. 23, 2022

(54) COMPOSITE POLYMERIC FILM WEAR LAYER FOR HARD SURFACES

(71) Applicant: LOWE'S COMPANIES, INC., Mooresville, NC (US)

(72) Inventor: Sundar Mohan Rao, Chattanooga, TN (US)

(73) Assignee: Lowe's Companies, Inc., Mooresville, NC (US)

( * ) Notice: Subject to any disclaimer, the term of this patent is extended or adjusted under 35 U.S.C. 154(b) by 150 days.

(21) Appl. No.: 16/633,166

(22) PCT Filed: Jul. 24, 2018

(86) PCT No.: PCT/US2018/043372
§ 371 (c)(1),
(2) Date: Jan. 23, 2020

(87) PCT Pub. No.: WO2019/023161
PCT Pub. Date: Jan. 31, 2019

(65) Prior Publication Data
US 2020/0139686 A1    May 7, 2020

Related U.S. Application Data

(60) Provisional application No. 62/536,485, filed on Jul. 25, 2017.

(51) Int. Cl.
| | |
|---|---|
| *B32B 3/02* | (2006.01) |
| *B32B 27/08* | (2006.01) |
| *B32B 5/18* | (2006.01) |
| *B32B 27/06* | (2006.01) |
| *B32B 27/30* | (2006.01) |
| *E04F 15/10* | (2006.01) |

(52) U.S. Cl.
CPC .............. *B32B 27/08* (2013.01); *B32B 5/18* (2013.01); *B32B 27/065* (2013.01); *B32B 27/304* (2013.01); *E04F 15/107* (2013.01); *B32B 2255/10* (2013.01); *B32B 2266/025* (2013.01); *B32B 2307/406* (2013.01); *B32B 2307/536* (2013.01); *B32B 2307/584* (2013.01); *B32B 2419/00* (2013.01)

(58) Field of Classification Search
CPC ........ E04F 15/105; E04F 15/107; E04F 13/18
See application file for complete search history.

(56) References Cited

U.S. PATENT DOCUMENTS

| | | |
|---|---|---|
| 4,176,210 A | 11/1979 | Skinner |
| 4,180,615 A | 12/1979 | Bettoli |
| 4,333,987 A | 6/1982 | Kwart et al. |
| 4,393,187 A | 7/1983 | Boba et al. |
| 4,507,188 A | 3/1985 | Chu |
| 5,888,119 A | 3/1999 | Christianson et al. |
| 6,991,830 B1 | 1/2006 | Hansson et al. |
| 8,591,696 B2 | 11/2013 | Smith |
| 8,658,274 B2 | 2/2014 | Chen et al. |
| 8,800,245 B1 | 8/2014 | Pien |
| 9,156,233 B2 | 10/2015 | Dossche et al. |
| 2005/0176321 A1 | 8/2005 | Crette et al. |
| 2015/0375471 A1 | 12/2015 | Song |
| 2016/0201324 A1 | 7/2016 | Hakansson et al. |
| 2016/0289980 A1 | 10/2016 | Tian et al. |
| 2016/0340916 A1 * | 11/2016 | Wright ............... B32B 5/26 |
| 2017/0022388 A1 | 1/2017 | Zhang |
| 2017/0370110 A1 * | 12/2017 | Feys ................... B44C 1/24 |

FOREIGN PATENT DOCUMENTS

| | | |
|---|---|---|
| EP | 2424911 B1 | 3/2016 |
| JP | 2017007156 | 1/2017 |
| WO | 9939042 | 8/1999 |
| WO | 2009018260 A1 | 2/2009 |
| WO | 2016134243 A2 | 8/2016 |
| WO | 2017064108 A1 | 4/2017 |
| WO | 2018067655 | 4/2018 |

OTHER PUBLICATIONS

Application No. CN201880046489.2, Office Action, dated Apr. 13. 2021, 8 pages.
Application No. EP18838337.6 , Extended European Search Report, dated Mar. 24, 2021, 10 pages.
International Search Report and Written Opinion for International Application No. PCT/US18/043372, dated Oct. 11, 2018, pp. 13.

* cited by examiner

*Primary Examiner* — Elizabeth E Mulvaney
(74) *Attorney, Agent, or Firm* — Kilpatrick Townsend & Stockton LLP

(57) ABSTRACT

A composite polymeric film wear layer for application as a surface protection layer to impart lower gloss, higher scratch resistance, wear performance and comfort under foot to hard surface substrates is provided. Hard surface substrate made with the composite as well as methods for application are also provided.

20 Claims, No Drawings

COMPOSITE POLYMERIC FILM WEAR LAYER FOR HARD SURFACES

This application claims priority to International Application No. PCT/US2018/043372, filed on Jul. 24, 2018, which is incorporated herein by reference in its entirety, which further claims priority to U.S. Provisional Application Ser. No. 62/536,485, filed on Jul. 25, 2017.

FIELD OF THE INVENTION

The present invention relates to a composite polymeric film wear layer. The wear layer of the present invention can be applied as a surface protection layer to impart lower gloss and higher scratch resistance, wear performance and comfort to hard surface substrates.

BACKGROUND OF THE INVENTION

Hard surface substrates such as Luxury Vinyl flooring have a balancing layer at the bottom, a core layer of polyvinyl chloride (PVC) and limestone, a printed layer of PVC, a wear layer of clear PVC, and a top layer coating that is UV curable polyurethane. To meet the need for lower gloss, the top layer coating typically contains silica particles having particle size diameter of about 1 to about 40 microns that act as a matting agent. The coating also has abrasion resistant agents such as aluminum oxide, to resist scratches.

Various coating layers and processes for application to hard surface substrates have been described.

U.S. Pat. No. 8,658,274 discloses a thermoplastic laminate plank with an optional overlay. The overlay or wear layer is an overlay paper, which upon being fixed to the print layer of the plank, is clear in appearance. Listed preferred high abrasive overlays with aluminum oxide embedded in the surface of a paper impregnated with an aminoplast resin for use in this thermoplastic plastic laminate plank include those from Mead Specialty Paper with the product numbers TMO 361, 461 (70 grams/m² premium overlay from Mead), and 561.

U.S. Pat. No. 9,156,233 discloses waterproof engineered floor and wall planks with a wear layer bonded to the core via a water-resistant adhesive. The wear layer is disclosed as waterproof and is selected from a number of possible materials including tile or stone veneer, rubber, decorative plastic, decorative vinyl, linoleum and any material such as cork, bamboo or wood veneer encapsulated in vinyl or resin to render the layer waterproof and wear resistant. An optional cover layer applied over the veneer of melamine resin with aluminum oxide and polyurethane is also disclosed.

U.S. Pat. No. 8,800,245 discloses a piece for flooring which includes a PVC wear layer, a pattern layer, a base layer, and a backing layer.

Published U.S. Patent Application No. 2015/0375471 discloses tiles for use in ceilings, walls, and floors, with a wear layer that comprises any suitable known abrasion resistance materials such as abrasion resistance macromolecular material coated on the layer beneath it, or a known ceramic bead coating. Alternatively, the wear layer may comprise an organic polymer layer and/or an inorganic material layer such as an ultraviolet coating, or a combination of another organic polymer layer and an ultraviolet coating. A disclosed example is an ultraviolet paint capable of improving the scratch resistance, glossiness, antimicrobial resistance and other properties of the product. Additional agents disclosed for inclusion as needed include organic polymers, polyvinyl chloride resins and vinyl resins, plasticizing agents and other processing additives.

U.S. Pat. No. 4,176,210 discloses a decorative sheet-type covering material having both PVC and polyurethane wear layers made by forming a sheet of gelled, foamable PVC plastisol or organosol on a substrate, and then applying and gelling, but not curing, a layer of nonfoamable PVC plastisol or organosol to the gelled, foamable layer. A layer of polyurethane is then applied to the gelled nonfoamable layer, and the entire sheet is heated to a temperature sufficient to decompose the blowing agent in the foamable layer and cure both the PVC layers and the polyurethane layer.

European Patent No. 2 424 911 discloses ultraviolet (UV) V spectra light emitting diode curable coatings for flooring and other applications to enhance their durability and finish.

PCT/US2008/071446 discloses a floor plank comprising a first sheet having at least one base layer, a print design located above the base layer, and at least one wear layer located above the print design and a second sheet adhered to the lower surface of the first sheet, wherein the two adjacent sides of the second sheet have projections to interlock with projections from an adjacent floor plank with complementary shape to each other to be interlockingly engageable with corresponding projections or recesses on adjacent floor planks. A disclosed preferred wear layer is a transparent PVC layer from about 5 mils to about 50 mils. Other examples of wear layers disclosed include acrylic polymers, polyolefins, and the like. Further, it is disclosed that the wear layer topcoat can be a thermoset layer or thermoplastic layers. Additional examples of wear layers are disclosed in U.S. Pat. Nos. 4,333,987; 4,180,615; 4,393,187; 4,507,188; and 8,591,696 and published U.S. Patent Application No. 2016/0201324.

However, these types of coatings result in several negatives. For example, when the surface is scratched using a Martindale scratch tester with 100 grit sand paper for 45 cycles, it generates a white powder of silica and polymeric dust and abrasion agent from the coating that is undesirable and concerning to consumers. Further, these coatings are expensive as, for example, the industry standard manufacturing process must include a line for substrate coating, complete with UV lamps and optional thermal annealing. In addition, there is potential for the coating to crack or fail, due to poor adhesion, thus creating unnecessary waste.

Similar issues exist in wood flooring, with as many as nine coating layers, with a top coat made up of UV curable polyurethane.

In addition, hard surfaces are known to be uncomfortable under foot compared to soft surfaces such as rugs and carpets. Standing for long times on hard flooring results in more fatigue and could result in pain at joints. Home owners have tried to solve this problem by using soft gel mats over hard surfaces in kitchens and other locations where they need to stand for long times. Underlayment backings below the core substrates do not help in this regard.

Protective layers for hard substrate surfaces which minimize or eliminate white powder generation due to scratching, and eliminate expensive coating chemistry and the additional process step of applying the coating are thus a long-felt need. Further, there is need to have a softer and more comfortable feel under the feet for hard surfaces while preserving existing advantages such as design and looks, and easy to install click lock joints.

SUMMARY OF THE INVENTION

An aspect of the present invention relates to a composite polymeric film wear layer for hard surfaces.

In one nonlimiting embodiment, the composite polymeric wear layer comprises a bottom polymeric layer comprising a polymer and matting agents dispersed therein, and a top polymeric layer comprising a polymer and a plurality of abrasion resistant particles. In some embodiment, the top layer further comprises a matting agent to lower gloss. In some embodiments, in between the bottom polymeric layer and the top polymeric layer is a middle polymeric layer.

In another nonlimiting embodiment, the composite polymeric wear layer comprises a bottom polymeric layer comprising a polymer and matting agents dispersed therein, and a clear transparent polymeric layer, and a top polymeric layer comprising a polymer and a plurality of abrasion resistant particles.

In another nonlimiting embodiment, the composite polymeric wear layer comprises a bottom polymeric layer comprising a polymer and matting agents dispersed therein, and a top polymeric layer comprising a polymer and a plurality of abrasion resistant particles. These two layers can have a Shore A hardness rating of 50 to 100. In this nonlimiting embodiment, between the bottom polymeric layer and the top polymeric layer is a clear and transparent middle polymeric layer which is softer and has a Shore OO Hardness rating of 20 to 100. This provides comfort under foot when this layer is mounted on a hard surface core. This composite layer can be mounted on top of a print layer which in turn is mounted on a core substrate or mounted on a digitally printed core substrate to create flooring.

In another nonlimiting embodiment, the composite polymeric wear layer comprises a bottom polymeric layer comprising a polymer and matting agents dispersed therein, and a top polymeric layer comprising a polymer and a plurality of abrasion resistant particles. In this nonlimiting embodiment, the bottom polymeric layer can be reverse printed to provide design. These two layers can have a Shore A hardness rating of 50 to 100. Underneath the bottom layer is a polymeric layer which is softer and has a Shore OO Hardness rating of 20 to 100. This may or may not be transparent. This composite layer can be mounted on top of a hard substrate core to create flooring.

Another aspect of the present invention relates to hard surface flooring. In one nonlimiting embodiment, the hard surface flooring comprises a bottom balancing layer, a core layer on top of the bottom balancing layer; a decorative or print layer on top of the core layer; and a composite polymeric wear layer of the present invention. In one nonlimiting embodiment, the bottom balancing layer, the core layer and the decorative or print layer of the hard surface flooring comprise polyvinyl chloride. In another nonlimiting embodiment, the bottom balancing layer, the core layer and the decorative or print layer of the hard surface flooring comprise nonvinyl polymers. In yet another nonlimiting embodiment of this hard surface flooring, the bottom balancing layer comprises wood, the core layer comprises a core platform, and the decorative or print layer comprises a wood veneer.

Another aspect of the present invention relates to a hard surface substrate comprising a core substrate and a composite polymeric wear layer of the present invention. Nonlimiting examples of core substrates that can be protected via the present invention include packaging film, countertops, and furniture.

Another aspect of the present invention relates to a method for protecting a surface of a hard surface substrate from scratching by applying the composite polymeric wear layer of the present invention to the hard surface substrate.

Yet another aspect of the present invention relates to a method for imparting lower gloss to a surface of a hard surface substrate by applying the composite polymeric wear layer of the present invention to the hard surface substrate.

DETAILED DESCRIPTION OF THE INVENTION

Before the present disclosure is described in greater detail, it is to be understood that this disclosure is not limited to particular embodiments as described, and as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure pertains. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features that may be readily separated from or combined with the features of any of the other several embodiments without departing from the scope or spirit of the present disclosure. Any recited method can be carried out in the order of events recited, or in any other order that is logically possible.

Embodiments of the present disclosure will employ, unless otherwise indicated, techniques of chemistry, fabrics, textiles, plastics, and the like, which are within the skill of the art. Such techniques are fully explained in the literature.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Provided by the present invention is a composite polymeric film wear layer which can be applied as a surface protection layer to impart lower gloss and higher scratch resistance, wear performance and comfort to hard surface substrates.

In one nonlimiting embodiment, the composite polymeric wear layer comprises a bottom polymeric layer comprising a polymer and matting agents dispersed therein. In one nonlimiting embodiment, the bottom layer contains a first polymeric continuous phase and a first discontinuous phase comprising a matting agent.

Nonlimiting examples of polymers which can be used in the bottom layer include, but are not limited, PVC or a variety of film producing polymers. Examples of such polymers include: polyethylene, low density polyethylene, linear low density polyethylene, high density polyethylene, medium density polyethylene, biaxially oriented polypropylene, uniaxially oriented polyethylene, polyester, biaxially oriented polyester, nylon, polyvinyl chloride, polylactic acid, acrylic polymers, polycarbonate, biobased polymers, biodegradable polymers, ethylene methacrylic acid copolymers, polymethyl methacrylic acid polymers, acetal polymers, ionomeric polymers, ethylene methacrylic copolymers, and other suitable film forming polymers. These polymers may also have recycle content, including pre-industrial, and post-industrial recycle content, renewable polymer content, and combinations thereof.

Nonlimiting examples of matting agents which are dispersed in this bottom layer include silica, $TiO_2$, calcium carbonate, talc, ester wax, polymethyl methacrylic acid, and combinations thereof. Matting agents in masterbatch form can be incorporated into polymer for cast film or blown film in the extrusion process. Another method of manufacture entails scattering matting agent particles in a uniform manner on a pre-formed film, then pressing the film under heat to embed the particles into the film. Other suitable manufacturing methods can also be implemented. The thickness of this film can range from about 5 microns to about 250 microns, preferably in the range of about 10 microns to about 150 microns and most preferably in the range of about 25 to about 100 microns. The concentration range of matting agents employed in the bottom layer can be from about 1% to about 50%, preferably 5% to 25% and most preferably from 5% to 15%.

In one nonlimiting embodiment, the bottom polymeric layer is formulated to provide a gloss in the range of 2-50, where gloss is measured by gloss meters such as a micro-tri-gloss instrument, model no. 4563, available through BYK-Gardner GmbH.

In this nonlimiting embodiment, the composite polymeric wear layer further comprises a top polymeric layer comprising a polymer and a plurality of abrasion resistant particles. In one nonlimiting embodiment, the top polymeric layer comprises a second polymeric continuous phase and a second discontinuous phase comprising abrasion resistant particles. In some embodiments, the top polymeric layer further comprises matting agent as described herein to lower gloss. In one nonlimiting embodiment, this resilient top layer contains less than 5% of matting agent. In one nonlimiting embodiment, the top polymeric layer has a durometer Shore A hardness in the range 50 to 100.

Nonlimiting examples of polymers that can be used in the top layer include PVC, or a variety of film producing polymers. Examples of such polymers include: polyethylene, low density polyethylene, linear low density polyethylene, high density polyethylene, medium density polyethylene, biaxially oriented polypropylene, uniaxially oriented polyethylene, polyester, biaxially oriented polyester, nylon, polyvinyl chloride, polylactic acid, acrylic polymers, polycarbonate, biobased polymers, biodegradable polymers, ethylene methacrylic acid copolymers, polymethyl methacrylic acid polymers, acetal polymers, ionomeric polymers, ethylene methacrylic copolymers, ethylene vinyl acetate, and other suitable film forming polymers, copolymers and blends thereof. These polymers may also have recycle content, including pre-industrial, and post-industrial recycle content, renewable polymer content, and combinations thereof.

The top polymeric layer is formulated to pass industry standard tests such as the EN-16094 test method, with minimum rating of MSR-A3 or better using procedure A, and a minimum rating of MSR-B3 or better if using procedure B.

Nonlimiting examples of abrasion resistant particles that are included in this top layer include aluminum oxide, corundum, silicon carbide, synthetic diamond, calcium carbonate, novaculite, pumice, rouge, sand, quartz, garnet, sandstone, tripoli, powdered feldspar, staurolite, boron nitride, ceramic iron oxide, glass particles, glass beads, glass spheres (hollow or filled), plastic grits, hard plastic particles, zirconia alumina, boron carbide, slags, and other particles with a mohs hardness of 7 or greater, or combinations thereof. Abrasion resistant particles in masterbatch form can be incorporated into polymer for cast or blown films in an extrusion process. Another effective method of manufacture is to scatter abrasion resistant particles in a uniform manner on a pre-formed film, and then press the film under heat to embed the particles into the film. Other suitable manufacturing methods can be implemented. The thickness range of this film can be from about 5 microns to about 250 microns, preferably in the range of 10 microns to 150 microns and most preferably in the range of 25 to 100 microns. The concentration range can be from 0.5% to 75%, preferably 5 to 60% and most preferably from 10 to 50%.

In one nonlimiting embodiment, in between the bottom polymeric layer and the top polymeric layer of the composite polymeric wear layer is a middle polymeric layer. In one nonlimiting embodiment, the middle layer is a cushioning layer. In one nonlimiting embodiment, the middle cushioning layer has a Shore OO hardness rating in the range 20 to 100, preferably in the range 40 to 100 and more preferably in the range 70 to 90.

Nonlimiting examples of polymers which can be used in the middle layer include but not limited to PVC or a variety of film producing polymers, polyethylene, low density polyethylene, linear low density polyethylene, high density polyethylene, medium density polyethylene, biaxially oriented polypropylene, uniaxially oriented polyethylene, polyester, biaxially oriented polyester, nylon, polyvinyl chloride (PVC), polylactic acid, acrylic polymers, polycarbonate, biobased polymers, biodegradable polymers, ethylene methacrylic acid copolymers, polymethyl methacrylic acid polymers, acetal polymers, ionomeric polymers, ethylene methacrylic copolymers, and other suitable film forming polymers, foamed PVC, foamed polypropylene, polyurethane, elastomeric polyurethane, thermoplastic elastomeric polymer, silicone rubber, butyl rubber, styrene butadiene rubber, polybutadiene, natural polyisoprene, ethylene vinyl acetate, synthetic poly isoprene copolymers and blends thereof. These polymers may also have recycle content, including pre-industrial, and post-industrial recycle content, renewable polymer content, and combinations thereof Thickness range of this film can be from about 25 microns to about 2000 microns, preferably in the range 100 microns to 1500 microns and most preferably in the range 250 to 1000 microns. The polymeric layer may be transparent or opaque and colored.

In some embodiments, the middle polymeric layer further comprises matting agent as described herein. In one nonlimiting embodiment, this middle layer contains less than 5% of matting agent.

In one nonlimiting embodiment of the composite polymeric wear layer of the present invention, the bottom polymeric layer comprising a polymer and a matting agent dispersed therein, and a clear transparent middle polymeric layer, are combined into a single layer. The top polymeric layer comprising a polymer and a plurality of abrasion resistant particles is then applied to this combined layer.

In another nonlimiting embodiment, the composite polymeric wear layer of the present invention can comprise a bottom polymeric layer comprising a polymer and matting agents dispersed therein, and a top polymeric layer comprising a polymer and a plurality of abrasion resistant particles. These two layers can have a Shore A hardness rating of 50 to 100. In this nonlimiting embodiment, between the bottom polymeric layer and the top polymeric layer is a clear and transparent middle polymeric layer which is softer and has a Shore OO Hardness rating of 20 to 100. This provides comfort under foot when this layer is mounted on a hard surface core. This composite layer can be mounted on top of a print layer which in turn is mounted on a core substrate or mounted on a digitally printed core substrate to create flooring.

In another nonlimiting embodiment, the composite polymeric wear layer of the present invention can comprise a bottom polymeric layer comprising a polymer and matting agents dispersed therein, and a top polymeric layer comprising a polymer and a plurality of abrasion resistant particles. In this nonlimiting embodiment, the bottom polymeric layer can be reverse printed to provide design. These two layers can have a Shore A hardness rating of 50 to 100. Underneath the bottom layer is a polymeric layer which is softer and has a Shore OO Hardness rating of 20 to 100. This may or may not be transparent. This composite layer can be mounted on top of a hard substrate core to create flooring.

As will be understood by the skilled artisan upon reading this disclosure, the above described layers and their functions may be rearranged in these composites and may not be required but rather optional and the invention is not necessarily bound by the number of layers and the order in which they are described supra.

Accordingly, additional nonlimiting examples of composites of the present invention include:

A composite transparent flooring layer which comprises a bottom layer containing a first polymeric continuous phase and a first discontinuous phase comprising a matting agent with durometer Shore A hardness in the range 50 to 100 and which has reverse printing to function as a decor layer. This nonlimiting embodiment may further comprise a top polymeric layer comprising a second polymeric continuous phase and a second discontinuous phase comprising abrasion resistant particles. This top polymeric layer also has a durometer Shore A hardness in the range 50 to 100. In addition, the top polymeric layer may further comprise a matting agent, preferable less than 5% of a matting agent. In addition, the transparent composite comprises a transparent middle cushioning layer between the bottom polymeric layer and the top layer with durometer Shore OO hardness in the range 20 to 100;

A composite flooring layer which comprises a bottom cushioning layer with durometer Shore OO hardness in the range 20 to 100. This nonlimiting embodiment further comprises a middle layer containing a first polymeric continuous phase and a first discontinuous phase comprising a matting agent with durometer Shore A hardness in the range 50 to 100. In this nonlimiting embodiment, the middle lay may have reverse printing to function as a decor layer. This nonlimiting embodiment further comprises a top polymeric layer comprising a second polymeric continuous phase and a second discontinuous phase comprising abrasion resistant particles, wherein the top polymeric layer also has a durometer Shore A hardness in the range 50 to 100;

A composite flooring layer which comprises a bottom cushioning layer with durometer Shore OO hardness in the range 20 to 100, a middle layer containing a first polymeric continuous phase and a first discontinuous phase comprising a matting agent with durometer Shore A hardness in the range 50 to 100, and a top polymeric layer comprising a second polymeric continuous phase and a second discontinuous phase comprising abrasion resistant particles, wherein the top polymeric layer has a durometer Shore A hardness in the range 50 to 100;

A composite flooring layer which comprises a top transparent cushioning layer comprising a polymeric phase with durometer Shore OO hardness in the range 20 to 100 comprising abrasion resistant particles and a transparent middle polymeric layer comprising a second polymeric continuous phase and a second discontinuous phase comprising abrasion resistant particles, wherein the polymeric layer has a durometer Shore A hardness in the range 50 to 100. In this nonlimiting embodiment, the middle layer may have a reverse printed surface at the bottom. In this embodiment, a transparent resilient top coating that contains less than 5% of matting agent may be optionally included; and A composite flooring layer comprising a transparent bottom cushioning layer comprising a polymeric phase with durometer Shore OO hardness in the range 20 to 100 comprising abrasion resistant particles. This nonlimiting embodiment further comprises a transparent middle polymeric layer comprising a second polymeric continuous phase and a second discontinuous phase comprising abrasion resistant particles. This middle polymeric layer has a durometer Shore A hardness in the range 50 to 100. In this embodiment, an resilient transparent top coating that contains less than 5% of matting agent can be optionally applied on top of the middle layer.

Total thickness for the composites of the present invention ranges from 40 to 3000 microns.

The polymeric material for the layers can be the same material, or different for each layer. For example, the top layer can be differentiated to include functionality such as antimicrobial efficacy, stain resistance, high chemical resistance, and self-healing properties. The top polymer layer can be made from more expensive polymers as this layer is thinner, and it is the most effective location for these enhanced and differentiated properties to be located to benefit the consumer.

In addition, in some nonlimiting embodiments, the composite polymeric wear layer may further comprises have an adhesive base to provide good adhesion with the substrate.

With the composites of the present invention, during any scratching process, only the top layer will typically be affected. However, unlike coating of the prior art, the top layer of the composite of the present invention has no matting agent such as silica particles to create a large quantity of white powder. Hence, any powder generated is minimized by the present invention. In addition, the presence of abrasion resistant particles in the top layer of the composite of the present invention further minimizes effects of scratches. The middle layer in the composite of the present invention, which is clear and fully transparent, provides further resistance against wear and provides a high rating in abrasion-based end use performance tests. The bottom layer of the composite is designed to provide the gloss needed for the particular product via the matting agent, while being protected from any scratching that would release white powder via the top and middle layers.

Further, the composite polymeric layer can be applied by various modes including but not limited to a co-extrusion process or, depending upon thickness, a blown film process may also be employed.

Alternatively, the layers of the composite can be prepared separately, and laminated via a laminating machine to make a composite. The laminate can then be applied as a wear layer to hard surface substrates such as luxury vinyl tile or plank in a continuous or batch process. This eliminates the need for a coating line with multiple coating application units, multiple tanks for storage of coating, and multiple UV curing stations along with the health and safety issues associated with such coatings.

Yet another alternative for application is to bring the individual layers of the composite together and stack them with, for example, the print layer, core layer and balancing layer, and then press all the layers together in a single process to create luxury vinyl tile (LVT), or luxury vinyl plank (LVP).

Also provided by the present invention are hard surface floorings and other hard surface substrates protected by the polymeric wear layers described herein.

Nonlimiting examples of hard surface flooring that can be protected by the wear layer of the present disclosure may comprise a bottom balancing layer, a core layer on top of the bottom balancing layer and a decorative or print layer on top of the core layer. In the present invention, the polymeric wear layer as described herein is being applied on top of the decorative or print layer in accordance with any of the methods described herein. Components used in the bottom balance layer, core layer and decorative print layer are well known to those of skill in the art and may include, but are not limited to, bottom balancing layers, core layers and decorative or print layers comprising polyvinyl chloride, bottom balancing layers, core layers and decorative or print layers comprising non vinyl polymers, and bottom balancing layers comprising wood, core layers comprising a core platform such as high density fiber board, or wood plastic composites, or multilayered plywood, or mineral boards, and decorative or print layers comprising a wood veneer.

Nonlimiting examples of additional core substrate which the polymeric wear layer of the present invention can be applied include packaging films, countertops, and furniture.

In addition, the present invention relates to methods for applying the composite polymeric wear layer of the present invention to a hard surface substrate to protect the hard surface substrate from scratching and/or to impart lower gloss to a surface of a hard surface substrate.

The following examples and test methods are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmospheres. Standard temperature and pressure are defined as 25° C. and 1 atmosphere.

Test Method

Testing was performed according to ASTM D5178, and EN 16094 ("LAMINATE FLOOR COVERINGS—TEST METHOD FOR THE DETERMINATION OF MICRO-SCRATCH RESISTANCE"), using a Martindale Scratch tester.

Shore A hardness of a given substrate was measured per ASTM D2240 using ASKER Super EX Durometer.

EXAMPLES

Example 1

A Martindale tester with 100 grit sand paper at 45 cycles was used to scratch sample A, which had a wear layer of PVC and a UV curable polyurethane coating on top of it. This sample had a gloss as measured by BYK Tri-Gloss meter 4563 as 5.55 gloss units. The sandpaper showed excessive amount of white powder and was measured at 3.0 mg. The same test method was used on Sample B, which had only a wear layer of PVC and no coating. The gloss of this sample was measured as 6.60 gloss units. The wear layer did not have abrasion resistant particles or matting agents as in the present invention. The amount of powder generated for samples B was measured as 1.6 mg. Thus, the image as depicted in FIG. 1 shows sample A having a higher level of powder generated during scratch tests and visually more scratches than sample B which has lower level of powder generation and visually less level of scratches. Hence the concept of having a wear layer alone instead of coating on top of wear layer shows surprising benefits. However, the gloss is higher with sample B, and to reduce it down to the gloss level of sample A, the invention will use a composite polymeric wear layer as protective layer. This will not only provide the gloss reduction desired, but also improve the scratch resistance due to abrasion resistant top layer.

Example 2

ASKER Super EX Durometer was used to measure Shore A Hardness. Durometer measures the depth of an indentation in the material created by a given force on a standardized presser foot. Higher numbers in its scale indicate a greater resistance to indentation, and thus harder materials, while lower numbers are indicative of less hard, softer materials. Sample C was STAINMASTER® 6"×48" Luxury Vinyl plank with click lock joints. Sample D was made by mounting Renolit PVC print layer with wear layer on top of sample C. Sample E was made by mounting 0.08" thick cross linked polypropylene foam layer (FloorMuffler) first on Sample C and then mounting Renolit PVC print layer with wear layer on top. The Shore A hardness of Polypropylene foam layer was measured as 40. This translates to Shore OO hardness rating of about 78. Six repeats of Durometer measurements were made on Samples C, D, and E and reported in Table 1.

TABLE 1

Durometer Shore A readings on various samples

| Sample | Test 1 | Test 2 | Test 3 | Test 4 | Test 5 | Test 6 | Average |
|---|---|---|---|---|---|---|---|
| C | 95 | 96 | 96 | 97 | 95 | 97 | 96 |
| D | 97 | 96 | 95 | 97 | 96 | 93 | 95.6 |
| E | 82 | 81 | 84 | 83 | 80 | 82 | 82 |

Shore A hardness for Sample E is significantly smaller than samples C or D. A smaller number denotes softer property of the substrate. This shows that addition of middle layer to a core substantially improves softness of the flooring.

The planks of samples C, D and E were laid out on the floor and three individuals were asked to walk on the samples six times each and asked to rate the comfort level in walking. Each individual rated sample E as having the most comfort under foot compared to samples C or D.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also the individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±8%, or ±10%, of the numerical value(s) being modified. In addition, the phrase "about 'x' to 'y'" includes "about 'x' to about 'y'". While the illustrative embodiments of the invention have been described with particularity, it will be understood that the invention is capable of other and different embodiments and that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present disclosure, including all features which would be treated as equivalents thereof by those skilled in the art to which the invention pertains.

What is claimed is:

1. Composite transparent flooring layer comprising:
   a. a bottom layer containing a first polymeric continuous phase and a first discontinuous phase comprising a matting agent with durometer Shore A hardness in the range 50 to 100;
   b. a top polymeric layer comprising a second polymeric continuous phase and a second discontinuous phase comprising abrasion resistant particles, wherein the top polymeric layer has a durometer Shore A hardness in the range 50 to 100 and wherein the top layer contains less than 5% of matting agent; and
   c. a middle cushioning layer between the bottom polymeric layer and the top layer.

2. The composite flooring layer of claim 1 wherein the first polymeric continuous phase comprises polyethylene, low density polyethylene, linear low density polyethylene, high density polyethylene, medium density polyethylene, biaxially oriented polypropylene, uniaxially oriented polyethylene, polyester, biaxially oriented polyester, nylon, polyvinyl chloride, polylactic acid, acrylic polymers, polycarbonate, biobased polymers, biodegradable polymers, ethylene methacrylic acid copolymers, polymethyl methacrylic acid polymers, acetal polymers, ionomeric polymers, and/or ethylene methacrylic copolymers.

3. The composite flooring layer of claim 2 wherein the first discontinuous phase comprises matting agents selected from silica, $TiO_2$, calcium carbonate, talc, ester wax, polymethyl methacrylic acid, and combinations thereof.

4. The composite flooring layer of claim 1 wherein the second polymeric continuous phase comprises polyethylene, low density polyethylene, linear low density polyethylene, high density polyethylene, medium density polyethylene, biaxially oriented polypropylene, uniaxially oriented polyethylene, polyester, biaxially oriented polyester, nylon, polyvinyl chloride, polylactic acid, acrylic polymers, polycarbonate, biobased polymers, biodegradable polymers, ethylene methacrylic acid copolymers, polymethyl methacrylic acid polymers, acetal polymers, ionomeric polymers, and/or ethylene methacrylic copolymers.

5. The composite flooring layer of claim 1 wherein the second discontinuous phase comprises abrasion-resistant particles selected from aluminum oxide, corundum, silicon carbide, synthetic diamond, calcium carbonate, novaculite, pumice, rouge, sand, quartz, garnet, sandstone, tripoli, powdered feldspar, staurolite, boron nitride, ceramic iron oxide, glass particles, glass beads, glass spheres (hollow or filled), plastic grits, hard plastic particles, zirconia alumina, boron carbide, slags, and other particles with a mohs hardness of 7 or greater, or combinations thereof.

6. The composite flooring layer of claim 1 wherein the middle cushioning layer between the bottom polymeric layer and the top layer comprises polyvinyl chloride, polyethylene, low density polyethylene, linear low density polyethylene, high density polyethylene, medium density polyethylene, biaxially oriented polypropylene, uniaxially oriented polyethylene, polyester, biaxially oriented polyester, nylon, polylactic acid, acrylic polymers, polycarbonate, biobased polymers, biodegradable polymers, ethylene methacrylic acid copolymers, polymethyl methacrylic acid polymers, acetal polymers, ionomeric polymers, ethylene methacrylic copolymers, foamed PVC, foamed polypropylene, polyurethane, elastomeric polyurethane, thermoplastic elastomeric polymer, silicone rubber, butyl rubber, styrene butadiene rubber, polybutadiene, natural polyisoprene, and/or synthetic poly isoprene.

7. The composite flooring layer of claim 1 wherein the middle cushioning layer has a Shore OO hardness rating in the range 20 to 100.

8. The composite flooring layer of claim 1 wherein a coating is applied on the top surface of the top layer.

9. The composite flooring layer of claim 8 wherein the coating is an UV curable polyurethane.

10. The composite flooring layer of claim 1 wherein the bottom polymeric layer provides a gloss value in the range of 2-50.

11. The composite flooring layer of claim 1 wherein the top polymeric layer provides a scratch resistance as measured by EN 16094 test method with a grade equal to or better than MSR-B3 by using procedure Bora grade equal to or better than MSR-A3 by using procedure A.

12. The composite flooring layer of claim 1 comprising a total thickness of 40 to 3000 microns.

13. The composite flooring layer of claim 1 wherein the bottom polymeric layer or top polymeric layer comprises a thickness from 5 microns to 250 microns.

14. The composite flooring layer of claim 1 wherein the middle polymeric layer comprises a thickness from 25 microns to 2000 microns.

15. A composite polymeric wear layer comprising:
   a. a bottom polymeric layer comprising a polymer and one or more matting agents; and
      b. a top polymeric layer comprising a polymer and a plurality of abrasion resistant particles.

16. A hard surface flooring comprising:
   a. a bottom balancing layer;
   b. a core layer on top of the bottom balancing layer;
   c. a decorative or print layer on top of the core layer; and
   d. the composite flooring layer of claim 1 on top of the core layer or the decorative or print layer.

17. The hard surface flooring of claim 16 wherein the bottom balancing layer, the core layer and the decorative or print layer comprise polyvinyl chloride.

18. The hard surface flooring of claim 16 wherein the bottom balancing layer, the core layer and the decorative or print layer comprise non-vinyl polymers.

19. The hard surface flooring of claim 16 wherein the bottom balancing layer comprises wood, the core layer comprises a core platform and the decorative or print layer comprises a wood veneer.

20. The composite polymeric wear layer of claim 15, wherein the top polymeric layer does not include a matting agent.

* * * * *